(12) United States Patent
Lee et al.

(10) Patent No.: US 11,691,618 B2
(45) Date of Patent: Jul. 4, 2023

(54) HYBRID VEHICLE WITH EXHAUST GAS PURIFYING UNIT AND DRIVING CONTROL METHOD THEREFOR

(71) Applicants: Hyundai Motor Company, Seoul (KR); Kia Motors Corporation, Seoul (KR)

(72) Inventors: Kyung Taek Lee, Seoul (KR); Jee Wook Huh, Gyeonggi-do (KR); Dong Jun Shin, Gyeonggi-do (KR); Jae-Yun Shim, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 897 days.

(21) Appl. No.: 16/515,399

(22) Filed: Jul. 18, 2019

(65) Prior Publication Data

US 2020/0108823 A1    Apr. 9, 2020

(51) Int. Cl.
*B60W 20/40* (2016.01)
*F01N 9/00* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/02; B60W 10/06; B60W 10/08; B60W 30/18009;
(Continued)

(56) References Cited

U.S. PATENT DOCUMENTS

2004/0249542 A1\* 12/2004 Murasugi ............ F16H 61/0213
                                                    701/55
2008/0309093 A1\* 12/2008 Ando ....................... B60K 6/52
                                                    290/40 C
(Continued)

FOREIGN PATENT DOCUMENTS

JP    2015-182509 A    10/2015
JP    2016-155409 A     9/2016
(Continued)

OTHER PUBLICATIONS

Notice of Allowance dated Mar. 27, 2023 in corresponding Korean Application No. 10-2018-0132801.

*Primary Examiner* — Thomas E Worden
*Assistant Examiner* — Daniel Tyler Reich
(74) *Attorney, Agent, or Firm* — Fox Rothschild LLP

(57) ABSTRACT

A hybrid vehicle includes an electric motor, an engine including an exhaust gas purifying unit, and an engine clutch disposed between the electric motor and the engine. A method of controlling the hybrid vehicle includes determining a driving environment condition including a first condition related to at least a driving load when a request for operating the exhaust gas purifying unit is received, determining a state of the engine clutch and an operation condition of the exhaust gas purifying unit when the exhaust gas purifying means operates according to the result of determining the driving environment condition, and operating the exhaust gas purifying unit while maintaining the determined state of the engine clutch when the driving environment condition is satisfied.

13 Claims, 7 Drawing Sheets

(51) Int. Cl.
*B60W 10/06* (2006.01)
*B60W 10/08* (2006.01)
*B60W 10/02* (2006.01)
*B60W 30/18* (2012.01)
*F01N 3/023* (2006.01)

(52) U.S. Cl.
CPC ....... *B60W 30/18009* (2013.01); *F01N 3/023* (2013.01); *F01N 9/002* (2013.01); *B60W 2552/15* (2020.02); *B60W 2555/20* (2020.02); *B60W 2710/021* (2013.01); *B60Y 2200/10* (2013.01); *B60Y 2300/476* (2013.01); *B60Y 2400/446* (2013.01); *F01N 2900/10* (2013.01); *F01N 2900/12* (2013.01)

(58) Field of Classification Search
CPC ......... B60W 2552/15; B60W 2555/20; B60W 2710/021; F01N 3/023; F01N 9/002; F01N 2900/10; F01N 2900/12; B60Y 2200/10; B60Y 2300/476; B60Y 2400/446; B60K 2006/4825; B60K 6/48; Y02T 10/40; Y02T 10/62
See application file for complete search history.

(56) References Cited

U.S. PATENT DOCUMENTS

| | | | | |
|---|---|---|---|---|
| 2010/0050602 | A1* | 3/2010 | Fujimoto | F02D 41/1474 60/299 |
| 2010/0185349 | A1* | 7/2010 | Harada | F02D 29/02 180/65.21 |
| 2013/0253747 | A1* | 9/2013 | Amano | B60W 10/08 180/65.265 |
| 2019/0039600 | A1* | 2/2019 | Hawley | B60W 30/188 |
| 2019/0322268 | A1* | 10/2019 | Leone | F02D 29/02 |

FOREIGN PATENT DOCUMENTS

| | | |
|---|---|---|
| KR | 10-2009-0062964 A | 6/2009 |
| KR | 10-1045078 B1 | 6/2011 |
| KR | 10-1703625 B1 | 2/2017 |

\* cited by examiner

Prior Art

HYBRID VEHICLE WITH EXHAUST GAS PURIFYING UNIT AND DRIVING CONTROL METHOD THEREFOR

CROSS-REFERENCE TO RELATED APPLICATION(S)

This application claims under 35 U.S.C. § 119(a) the benefit of Korean Patent Application No. 10-2018-0132801, filed on Oct. 8, 2018, which is hereby incorporated by reference herein.

BACKGROUND

(a) Technical Field

The present disclosure relates to a hybrid vehicle including an exhaust gas purifying unit of an internal combustion engine, and a method of controlling operation of the exhaust gas purifying unit.

(b) Description of the Related Art

Hybrid vehicles (hybrid electric vehicles (HEVs)) generally refer to vehicles using two power sources: an engine and an electric motor. Such hybrid vehicles are superior to vehicles including only an internal combustion engine in terms of fuel efficiency and power performance and are also advantageous in reduction of exhaust gas.

A hybrid vehicle may operate in two driving modes, depending on which powertrain is driven. One of the two modes is an electric vehicle (EV) mode using an electric motor and the other is an HEV mode for operating both an electric motor and an engine. The hybrid vehicle performs switching between the two modes according to driving conditions.

Switching between driving modes is generally performed for the purpose of maximizing fuel efficiency or driving efficiency according to the efficiency characteristics of the powertrain.

First, the structure of a hybrid vehicle will be described. FIG. 1 (RELATED ART) is a schematic view showing an example of a powertrain structure of a general parallel-type hybrid vehicle.

Referring to FIG. 1, a powertrain of a hybrid vehicle using a parallel-type hybrid system in which an electric motor (or a driving motor) 140 and an engine clutch (EC) 130 are mounted between an internal combustion engine (ICE) 110 and a transmission 150 is shown.

In such a vehicle, generally, when a driver presses an accelerator after startup, the motor 140 is first driven using power of a battery in a state in which the engine clutch 130 is open, and power of the motor is transmitted to the transmission 150 and a final drive (FD) 160, thereby moving the wheels (that is, an EV mode). When a larger driving force is required as the vehicle is gradually accelerated, an auxiliary motor (or a starting power generation motor) 120 may operate to drive the engine 110.

When the rotation speeds of the engine 110 and the motor 140 become equal to each other, the engine clutch 130 is engaged, and the engine 110 and the motor 140 drive the vehicle or the engine 110 drives the vehicle (that is, the EV mode transitions to the HEV mode). When a predetermined engine off condition such as vehicle deceleration is satisfied, the engine clutch 130 is open and the engine 110 is stopped (that is, the HEV mode transitions to the EV mode). In addition, in the hybrid vehicle, driving force of the wheels during braking may be converted into electric energy to charge the battery, which is referred to as braking energy regeneration or regenerative braking.

The starting power generation motor 120 serves as a starter motor when the engine is started and operates as a power generator at the time of recovery of the rotation energy of the engine after startup or at an off time. Therefore, the starting power generation motor 120 may be referred to as a hybrid starter generator (HSG), and in some cases, may be referred to as an auxiliary motor.

Meanwhile, in the case of a hybrid electric vehicle (HEV)/plug-in hybrid electric vehicle (PHEV), the engine 110 preferentially uses an Atkinson cycle instead of an Otto cycle, in order to maximize fuel efficiency. However, since the Atkinson cycle is inferior to the Otto cycle in terms of output, a gasoline direct injection (GDI) engine and turbo gasoline direct injection (T-GDI) also may be applied.

However, the GDI engine generates a lot of soot as compared to a multipoint injection (MPI) engine. Exhaust gas regulations of the GDI engine have been strengthened in countries such as Europe sensitive to reduction of harmful materials included in the exhaust gas, such as soot. In order to cope with such exhaust gas regulations, application of an exhaust gas purifying unit, e.g., a gasoline particulate filter (GPF), may be considered. The GPF is a device for storing soot generated during combustion and reducing soot using a burning method when a certain condition is satisfied, and GPF regeneration means that accumulated soot is burned. In the case of the HEV/PHEV, at the time of GPF regeneration, the engine clutch 130 is disengaged, and then the engine is driven through the HSG 120. This will be described with reference to FIG. 2.

FIG. 2 (RELATED ART) is a schematic view showing an example of GPF regeneration in a general hybrid vehicle. Referring to FIG. 2, the most important condition of GPF regeneration is temperature. When a GPF temperature reaches a predetermined GPF regeneration entry temperature, an engine control unit (engine management system (EMS)) requests GPF regeneration. Then, a high-level controller (e.g., a hybrid control unit (HCU)) disengages the engine clutch 130 and drives the engine through the HSG 120, for GPF regeneration. At this time, the engine is in a fuel cut state. When GPF regeneration is completed, the engine clutch 130 may be engaged again.

However, in order to exceed the GPF regeneration entry temperature, it is necessary to drive the engine 100. However, in the case of the HEV/PHEV, the engine 110 is frequently turned off. That is, even if a temperature capable of GPF regeneration is reached, driving of the engine 110 is stopped when entering the EV mode, thereby rapidly lowering the GPF temperature. Therefore, it is difficult to immediately perform GPF regeneration at a desired point in time.

In addition, the problems of GPF regeneration appear even in uphill driving. Such a method is applicable to uphill driving, but an engine on/off strategy of uphill driving is generally different from that of flat driving. Therefore, a differentiated GPF regeneration strategy is necessary. This will be described with reference to FIG. 3.

FIG. 3 (RELATED ART) is a schematic view illustrating engine clutch states at the time of uphill driving and downhill driving in a general hybrid vehicle. FIG. 3 (*a*) shows the state of operating the engine and the accelerator pedal at the time of uphill driving, and FIG. 3 (*b*) shows the state of operating the engine and the accelerator pedal at the time of downhill driving.

First, referring to FIG. 3 (a), since the operation amount of the accelerator pedal is generally large at the time of uphill driving, required power is high and the frequency of maintaining the engine clutch in the engaged state is high. In contrast, as shown in FIG. 3 (b), at the time of downhill driving, since the vehicle is accelerated by a gradient, an accelerator pedal sensor (APS) is frequently turned off. Therefore, the engine clutch is frequently disengaged due to an engine off condition.

Accordingly, at the time of uphill driving, even if the APS is intermittently turned off, the APS is immediately turned on. When the engine is frequently turned on/off and the engine clutch is engaged/disengaged according to the APS value, it is difficult to secure a GPF regeneration temperature or time.

Accordingly, there is a need for a differentiated GPF regeneration control method considering an uphill driving situation and a downhill driving situation.

SUMMARY

An object of the present disclosure is to provide a hybrid vehicle capable of more efficiently performing gasoline particulate filter (GPF) regeneration, and a control method thereof.

Another object of the present disclosure is to provide a hybrid vehicle capable of performing GPF regeneration in consideration of an uphill driving situation, and a control method thereof.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling a hybrid vehicle including an electric motor, an engine including an exhaust gas purifying unit, and an engine clutch disposed between the electric motor and the engine includes determining a driving environment condition including a first condition related to at least a driving load when a request for operating the exhaust gas purifying unit is received, determining a state of the engine clutch and an operation condition of the exhaust gas purifying unit when the exhaust gas purifying means operates according to the result of determining the driving environment condition, and operating the exhaust gas purifying unit while maintaining the determined state of the engine clutch when the driving environment condition is satisfied.

In another aspect of the present disclosure, a hybrid vehicle including an electric motor, an engine including an exhaust gas purifying unit, and an engine clutch disposed between the electric motor and the engine includes a first controller configured to control the engine and to request operation of the exhaust gas purifying unit, and a second controller configured to determine a driving environment condition including a first condition related to at least a driving load when the request is received, to determine a state of the engine clutch and an operation condition of the exhaust gas purifying unit when the exhaust gas purifying means operates according to the result of determining the driving environment condition, and to operate the exhaust gas purifying unit while maintaining the determined state of the engine clutch when the driving environment condition is satisfied.

In a further aspect of the present disclosure, a non-transitory computer-readable recording medium containing program instructions executed by a processor includes: program instructions that determine a driving environment condition including a first condition related to at least a driving load when a request for operating an exhaust gas purifying unit is received; program instructions that determine a state of the engine clutch and an operation condition of the exhaust gas purifying unit when the exhaust gas purifying means operates according to the result of determining the driving environment condition; and program instructions that operate the exhaust gas purifying unit while maintaining the determined state of the engine clutch when the driving environment condition is satisfied.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
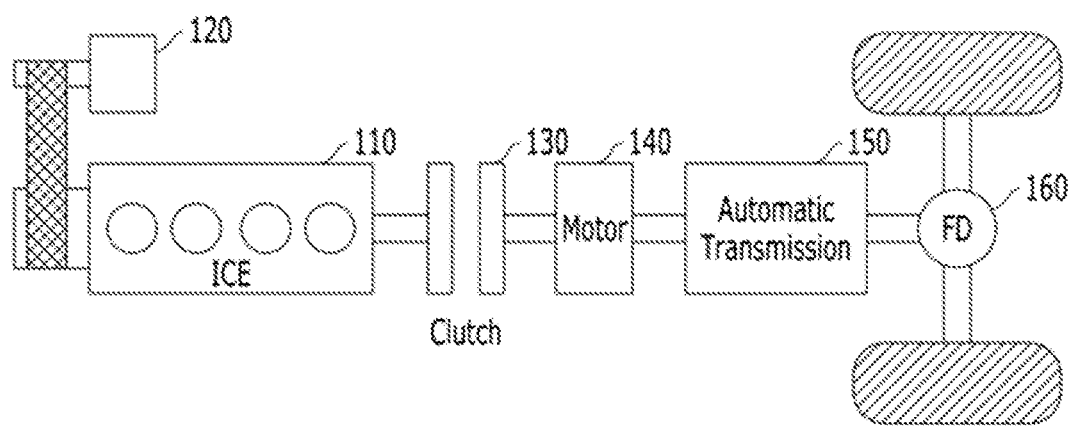
FIG. 1 (RELATED ART) is a schematic view showing an example of a powertrain structure of a general parallel-type HEV.
Figure 2:
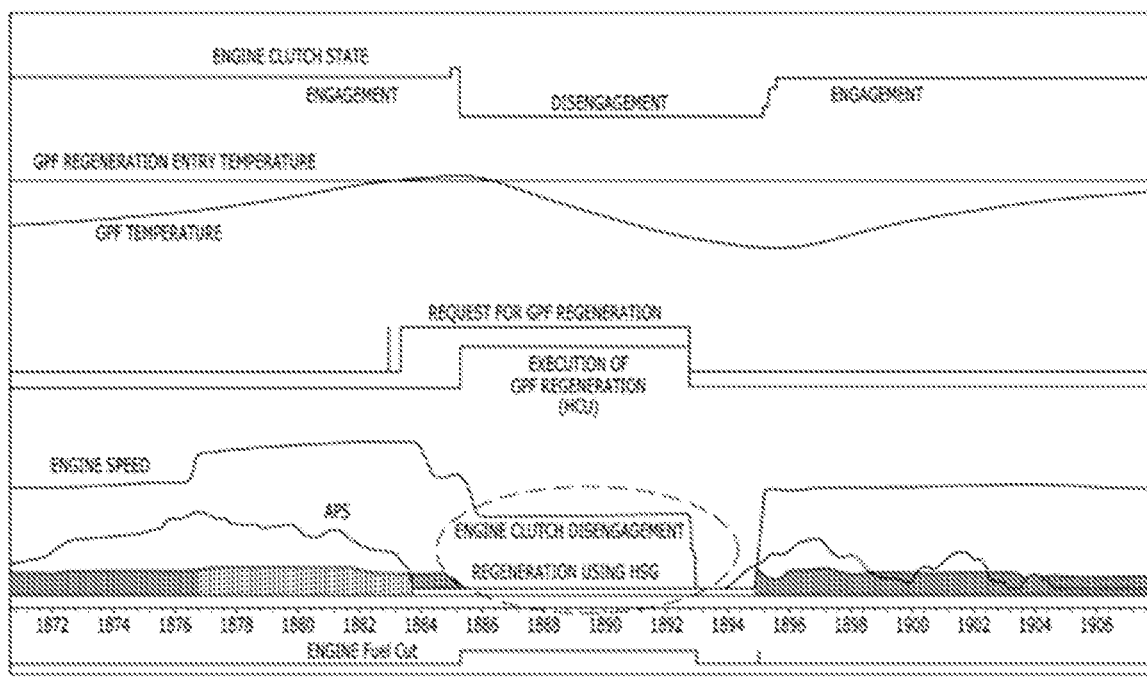
FIG. 2 (RELATED ART) is a schematic view showing an example of GPF regeneration in a general hybrid vehicle.
Figure 3:
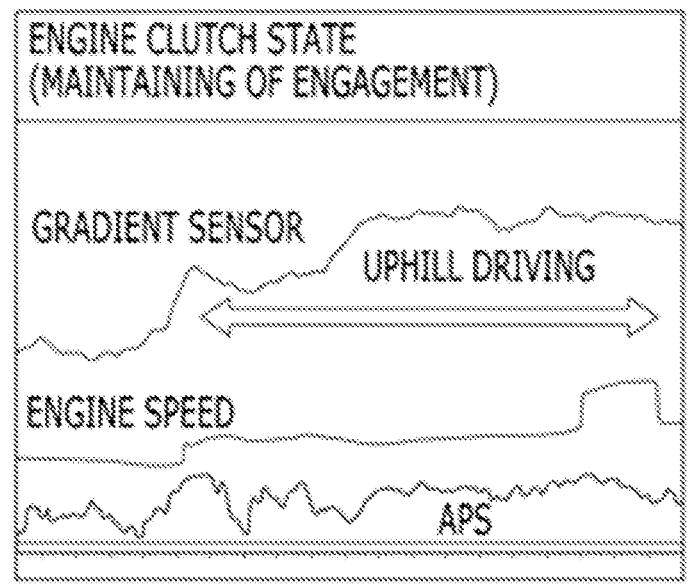
FIG. 3 (RELATED ART) is a schematic view illustrating engine clutch states at the time of uphill driving (a) and downhill driving (b) in a general hybrid vehicle.
Figure 3:
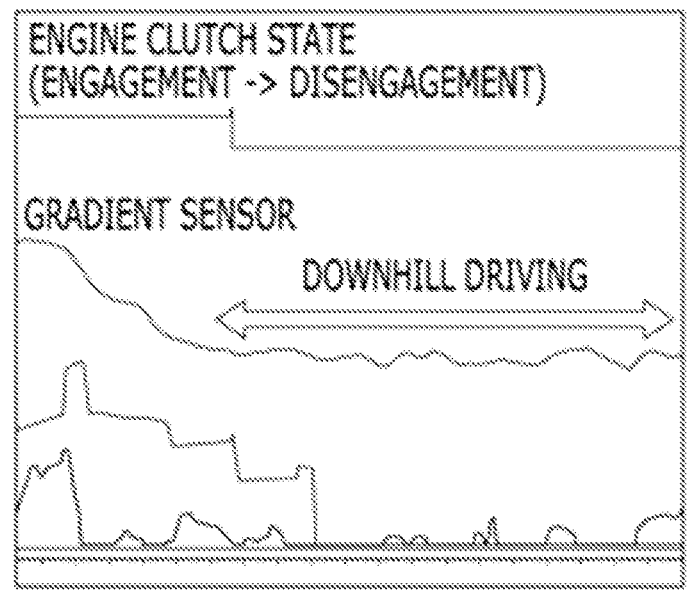

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the embodiments of the present disclosure will be described in detail with reference to the accompanying drawings so as to be easily implemented by those skilled in the art. However, the present disclosure may be variously implemented and is not limited to the embodiments described herein. In the drawings, in order to clearly describe the present disclosure, portions which are not related to the description of the present disclosure will be omitted and similar portions are denoted by similar reference numerals throughout the specification.

Prior to description of a GPF regeneration control method according to the embodiment of the present disclosure, a control system of a hybrid vehicle applicable to the embodiments will be described. The basic powertrain structure of the hybrid vehicle applicable to the embodiments of the present disclosure is shown in FIG. 1. A relationship between controls in the vehicle, to which such a powertrain is applied, is shown in FIG. 4.

Figure 4:
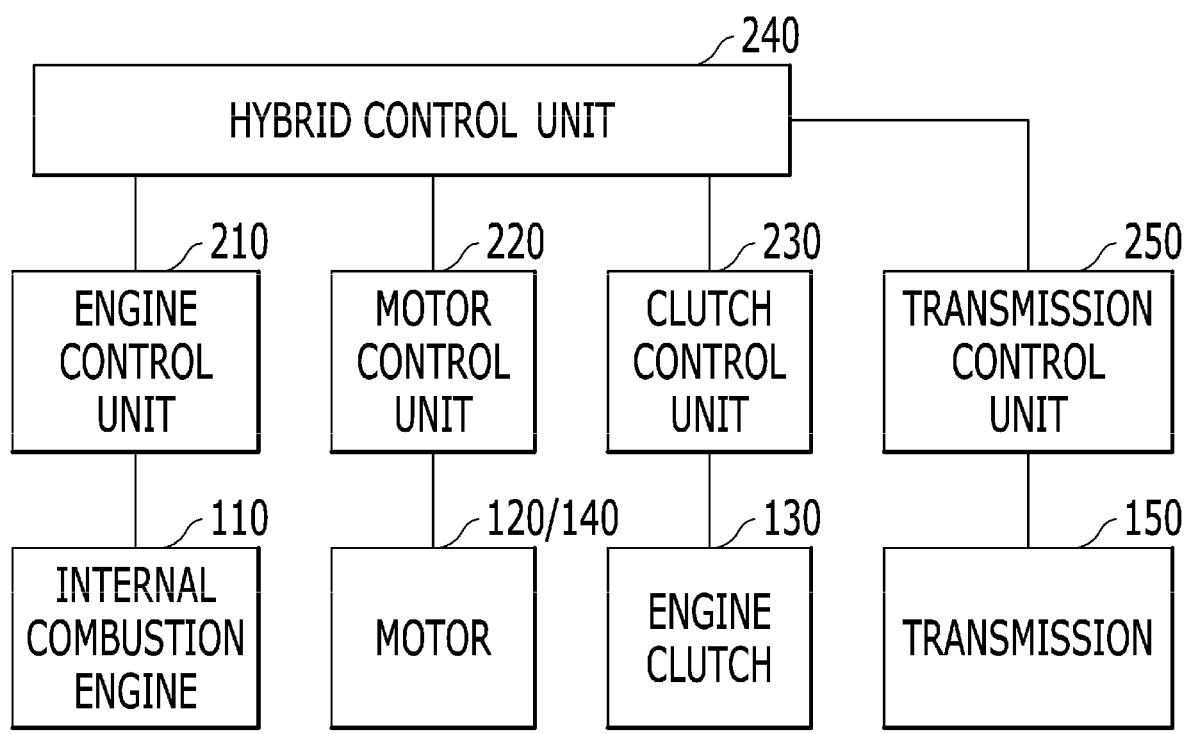
FIG. 4 is a block diagram showing an example of a control system of a hybrid vehicle, to which the embodiments of the present disclosure are applicable.

FIG. 4 is a block diagram showing an example of a control system of a hybrid vehicle, to which the embodiments of the present disclosure are applicable.

Referring to FIG. 4, in the hybrid vehicle, to which the embodiments of the present disclosure are applicable, an internal combustion engine 110 may be controlled by an engine control unit 210, torques of a starting power generation motor 120 and an electric motor 140 may be controlled by a motor control unit (MCU) 220, and an engine clutch 130 may be controlled by a clutch control unit 230. Here, the engine control unit 210 is also referred to as an engine management system (EMS). In addition, a transmission 150 is controlled by a transmission control unit 250. In some cases, a control unit of the starting power generation motor 120 and a control unit of the electric motor 140 may be separately provided.

Each control unit may be connected to a hybrid controller unit (HCU) 240 for controlling an overall mode switching process as a high-level control unit thereof to perform operation according to a control signal or provide information necessary for a driving mode change or engine clutch control at the time of gear shifting and/or information necessary for engine stop control to the HCU 240 under control of the HCU 240.

In particular, the HCU 240 determines whether a mode is switched according to the driving state of the vehicle. For example, the HCU determines when the engine clutch 130 is open and performs hydraulic pressure control (in the case of wet engine clutch) or torque capacity control (in the case of dry engine clutch) when the engine clutch is open. In addition, the HCU 240 may determine the state (lock-up, slip, open, etc.) of the engine clutch and control a fuel cut time of the engine 110. In addition, the HCU may transmit a torque command for controlling the torque of the starting power generation motor 120 to the motor control unit 110 for engine stop control and may control engine rotational energy recovery. In addition, the HCU 240 may determine a mode switching condition at the time of driving mode switching control and control a low-level control unit for switching.

It will be apparent to those skilled in the art that the connection relationship between the control units and the functions/division of the control units are illustrative and the names of the control units may be changed. For example, the HCU 240 may be implemented such that the functions thereof are provided by any one of the control units other than the HCU or such that the functions thereof are distributed and provided by two or more of the other control units.

It will be apparent to those skilled in the art that the configuration of FIG. 4 is merely an example of a hybrid vehicle and the structure of the hybrid vehicle applicable to the embodiment is not limited thereto.

As described above, in the general hybrid vehicle, when the engine control unit 210 requests GPF regeneration, the HCU 240 determines whether to enter GPF regeneration. After the engine clutch 130 is disengaged, the engine 110 rotates using the HSG 120 in a fuel cut state, thereby performing GPF. However, in the case of the HEV/PHEV, unlike the vehicle including the internal combustion engine, since the engine 110 is frequently turned on/off, the GPF temperature is rapidly decreased when the engine is turned off. Therefore, it is difficult for the HCU 240 to immediately respond to the request for GPF regeneration of the engine control unit 210. In addition, in the general hybrid vehicle, since there is no differentiated GPF regeneration strategy at the time of uphill/downhill driving, in a high-load area such as uphill driving, in which the frequency of maintaining engagement of the engine clutch 130 is high, even if there is a request for GPF regeneration, it is difficult to enter GPF regeneration using the HSG 120 due to engagement of the engine clutch 130. In a low-load area such as downhill driving, the frequency of disengaging the engine clutch is high, but maintaining this state is not secured.

Accordingly, in the embodiments of the present disclosure, for efficient GPF regeneration control, a GPF regeneration entry condition may be variably set in consideration of various factors affecting GPF regeneration.

According to an aspect of the present embodiment, the factors affecting GPF regeneration may include the amount of accumulated soot, an outside temperature and a gradient. This is because the engine control unit 210 frequently transmits the request for GPF regeneration to the HCU 240 when the amount of accumulated soot is high, it is difficult to satisfy a minimum temperature condition for entering GPF regeneration when the outside temperature is low, and the gradient affects whether the engine clutch is disengaged. Here, the information may be collected by the hybrid controller unit, the gradient information may be acquired by a gradient sensor, the outside temperature may be acquired by an outside temperature sensor, and the amount of accumulated soot of the GPF may be acquired from the engine control unit to the hybrid controller unit.

According to an aspect of the present embodiment, the GPF regeneration control process may include a step of determining whether the engine clutch is maintained in the disengaged state or in the engaged when the soot is burned in consideration of the driving environment condition. Here, the driving environment condition may mean the individual state of the factor affecting GPF regeneration.

When the engine clutch is maintained in the disengaged state, the vehicle travels in the EV mode and rotates the engine through the HSG, as described above. In contrast, when the engine clutch is engaged, the engine is in the fuel cut state and the engine is rotated by the driving force of the electric motor and the rotational inertia of the wheel, thereby performing GPF regeneration.

The gradient condition of the driving environment condition may be considered as follows.

In the present embodiment, in a high-load area such as uphill driving, GPF regeneration may be performed in a state in which the engine clutch is engaged. This is because, at the time of uphill driving, even if the APS is intermittently turned off, since a reacceleration occurrence probability through ON of the APS is high, forcibly maintaining engagement of the engine clutch and performing GPF regeneration at the time of request for GPF regeneration prevents additional engine clutch engagement/disengagement repetition, thereby minimizing route loss. In contrast, in a low-load area such as downhill driving, since the frequency of traveling in a state of maintaining disengagement of the engine clutch is high, the disengagement state of the engine clutch is forcibly maintained at the time of request for GPF regeneration to perform GPF regeneration through the HSG, thereby rapidly completing regeneration.

Next, the amount of accumulated soot and the outside temperature of the driving environment condition may be considered as follows.

When GPF regeneration is not performed and soot is continuously accumulated, since the engine control unit requests continuous operation of the engine for GPF regeneration, fuel efficiency is likely to deteriorate. Accordingly, when the amount of accumulated soot is large, the entry condition of GPF regeneration may be changed such that GPF regeneration is rapidly performed. In addition, when the outside temperature is low, since it is difficult to reach a minimum temperature for GPF regeneration, the entry condition may be changed such that GPF regeneration is rapidly performed if the temperature condition is satisfied during driving.

Figure 5:
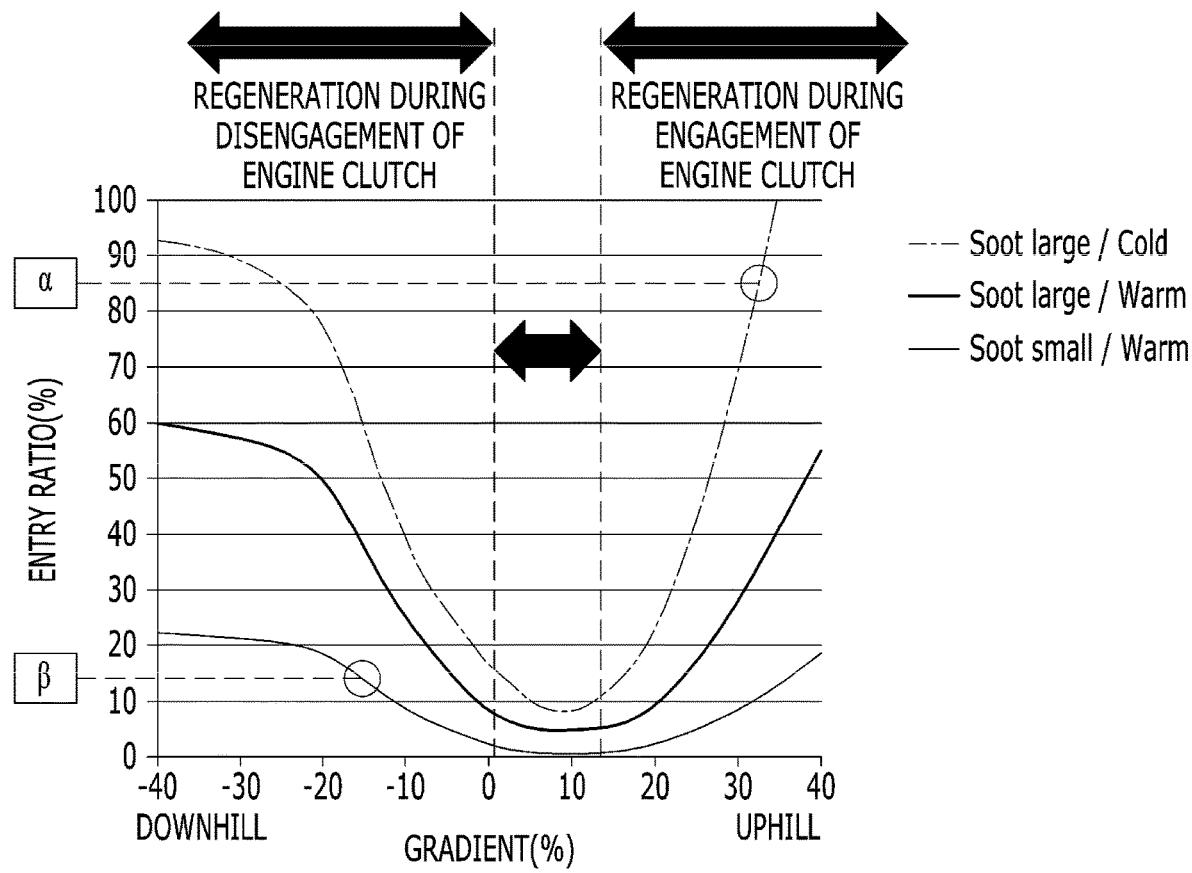
FIG. 5 is a graph showing an example of a relationship between a driving environment condition and a GPF regeneration entry ratio according to an embodiment of the present disclosure.

Change in entry condition of GPF regeneration considering the above-described driving environment condition is summarized in the graph of FIG. 5. FIG. 5 is a graph showing an example of a relationship between a driving environment condition and a GPF regeneration entry ratio according to an embodiment of the present disclosure Referring to FIG. 5, the GPF regeneration entry ratio may be increased as the gradient of the downhill is increased in regeneration during disengagement of the engine clutch, and may be increased as the gradient of the uphill is increased in regeneration during engagement of the engine clutch.

In addition, the GPF regeneration entry ratio when the outside temperature is low (cold) may be set to be greater than the GPF regeneration entry ratio when the outside temperature is high (warm). In addition, the GPF regeneration entry ratio when the amount of accelerated soot is large may be set to be greater than the GPF regeneration entry ratio when the amount of accumulated soot is small.

As a result, as the gradient is increased, the amount of accumulated soot is increased and the outside temperature is decreased, the GPF regeneration entry ratio is increased. In the GPF regeneration method, GPF regeneration is performed during disengagement of the engine clutch in the case of downhill driving and is performed during engagement of the engine clutch in the case of uphill driving. Uphill or downhill in the determination of the GPF regeneration method may be replaced with a driving load.

In addition, the GPF regeneration entry ratio during engagement of the engine clutch may be denoted by "a" and the GPF regeneration entry ratio during disengagement of the engine clutch may be denoted by "P". That is, whether the GPF regeneration entry ratio is "a" or "P" may be determined according to the gradient, and the magnitude of "a" or "P" may be determined by considering the outside temperature, the amount of accumulated soot and the gradient.

The graph of FIG. 5 may be replaced with a look-up table shown in Tables 1 to 3 below.

TABLE 1

| Item | amount | Gradient | | |
|---|---|---|---|---|
| | | Downhill | Flat | Uphill |
| Amount of collected soot | Large | a | b | c |
| | Medium | d | e | f |
| | Small | g | h | i |

TABLE 2

| Item | Outside temperature | | |
|---|---|---|---|
| | low | medium | High |
| Factor | j | k | l |

Referring to Table 1, first factors for the gradient and the amount of collected soot may be defined. Second factors for the outside temperature may be defined in Table 2. The final value of "α" or "β" may be determined according to the first factors and the second factors as shown in Table 3 below.

TABLE 3

| Driving condition item | Gradient Amount of collected soot Outside temperature | |
|---|---|---|
| Entry ratio | α | β |

When "α" or "β" is determined, each value may be converted into the unit of power, that is, the entry ratio "α" may be converted into "α'" representing power and the entry ratio "β" may be converted into "β'" representing power. It will be apparent to those skilled in the art that the exchange ratio of the entry ratio and the power may be differently set according to vehicles in consideration of the powertrain configuration or efficiency/soot accumulation capacity of the GPF. However, the larger "α" or "β", the faster GPF regeneration and the longer the GPF regeneration time.

When the entry ratio is converted into power, the converted power may be added to the outputtable power of the electric motor, thereby finally determining whether to enter GPF regeneration. This will be described with reference to FIG. 6.

Figure 6:
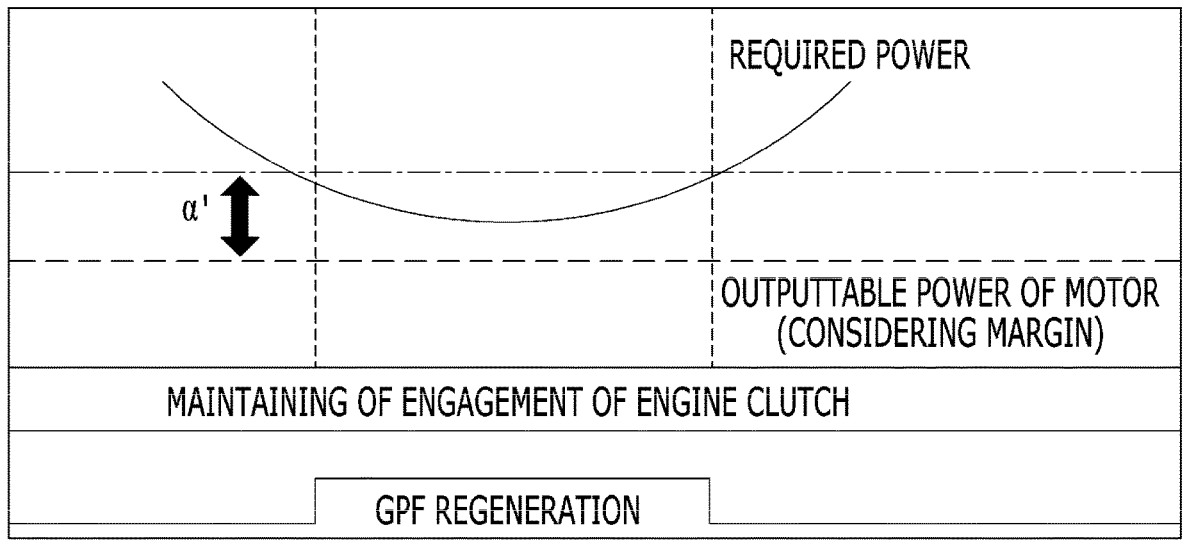
FIG. 6 is a schematic view illustrating determination as to whether to finally enter GPF regeneration according to a GPF regeneration entry ratio.
Figure 6:
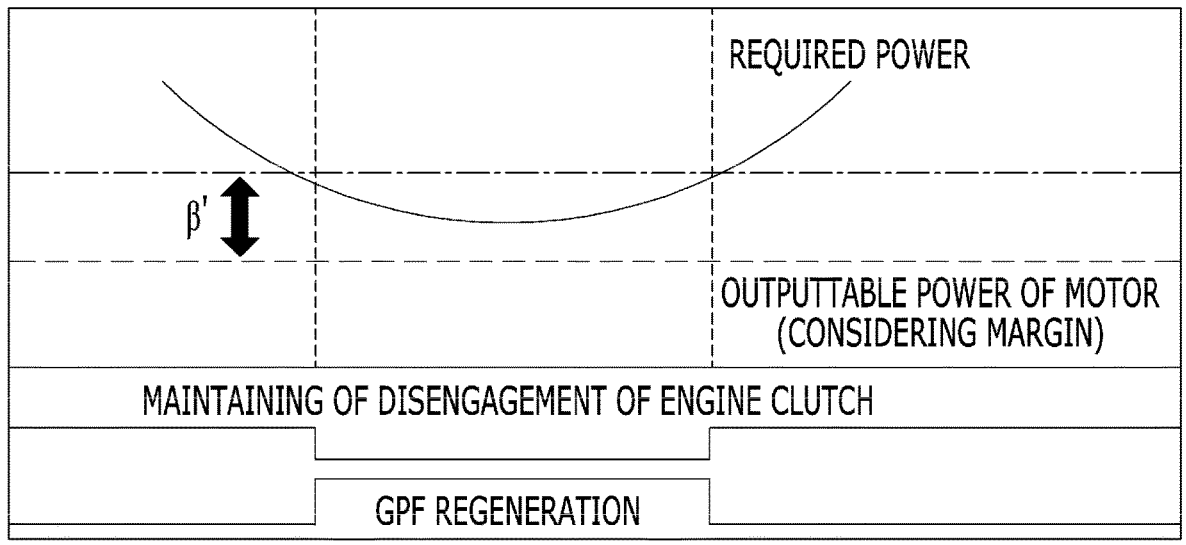

FIG. 6 is a schematic view illustrating determination as to whether to finally enter GPF regeneration according to a GPF regeneration entry ratio. FIG. 6 (a) shows the influence of "α'" when GPF regeneration is performed in a state in which engagement of the engine clutch is maintained, and FIG. 6 (b) shows the influence of "β'" when GPF regeneration is performed in a state in which disengagement of the engine clutch is maintained.

First, referring to FIG. 6 (a), if required power according to the APS operated by the driver is less than a sum of the outputtable power of the electric motor and α', entry into GPF regeneration may be possible in a state in which engagement of the engine clutch is maintained. Engagement of the engine clutch may be maintained at least while GPF regeneration is performed.

Next, referring to FIG. 6 (b), if required power according to the APS operated by the driver is less than a sum of the outputtable power of the electric motor and β', entry into GPF regeneration may be possible in a state in which disengagement of the engine clutch is maintained. Disengagement of the engine clutch may be maintained at least while GPF regeneration is performed.

Here, the outputtable power of the electric motor may be a value considering a predetermined margin. For example, the outputtable power of the electric motor may be a value obtained by subtracting the predetermined margin from the current maximum power of the electric motor for stable output by considering factors (e.g., motor temperature, battery SOC, etc.) affecting the current output of the electric motor. Here, the predetermined margin may be flexibly set according to the motor temperature or the battery SOC, and may be a fixed value or a value corresponding to the maximum value of α' or β', without being limited thereto. In addition, referring to FIGS. 6 (a) and (b), if the current required power becomes greater than the sum of the outputtable power of the electric motor and α' or β', GPF regeneration may be stopped. That is, GPF regeneration may be performed while the sum of the outputtable power of the electric motor and α' or β' is less than the required power.

Figure 7:
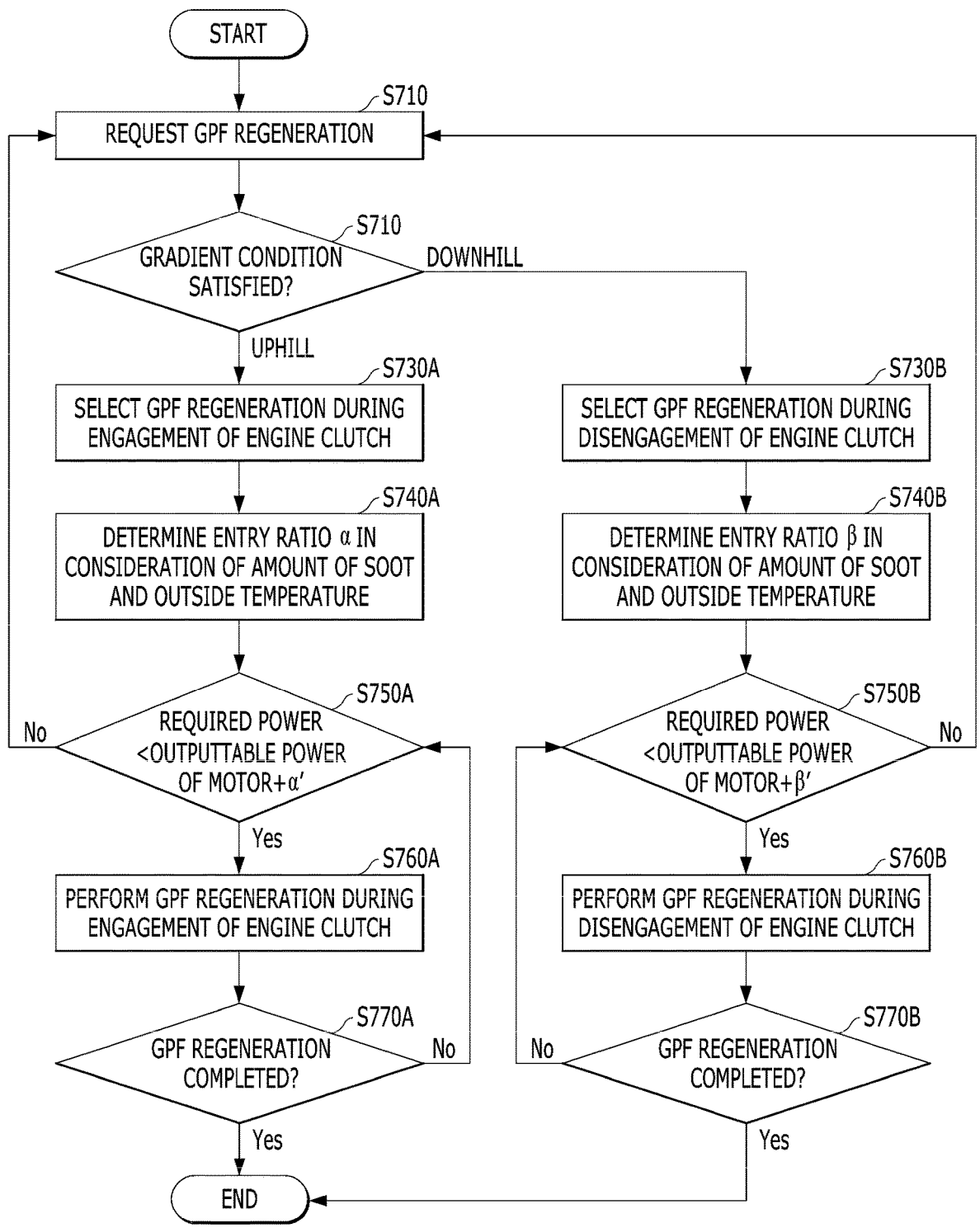
FIG. 7 is a flowchart of a GPF regeneration control process according to an embodiment of the present disclosure.

The above-described GPF regeneration control process is summarized in the flowchart of FIG. 7.

FIG. 7 is a flowchart of a GPF regeneration control process according to an embodiment of the present disclosure.

Referring to FIG. 7, first, when the engine control unit 210 requests GPF regeneration (S710), the HCU 240 may determine the driving environment condition.

Specifically, first, the HCU 240 determines a gradient condition (S720), selects GPF regeneration during engagement of the engine clutch 130 under an uphill condition (or a high-load driving situation) (S730A), and determines the GPF regeneration entry ratio α in consideration of the amount of accumulated soot and the outside temperature in addition to the gradient (S740A). The HCU 240 may perform GPF regeneration in a state in which engagement of the engine clutch 130 is maintained (S760A), when a value obtained by summing the outputtable power of the motor and the value α' obtained by converting the entry ratio α into power is greater than the current required power (Yes of S750A). Step S750A may be repeatedly performed until GPF regeneration is completed. When the required power is further increased (No of S750A), GPF regeneration is stopped and the HCU 240 waits for the request for GPF regeneration from the engine control unit 210.

Meanwhile, upon determining that the gradient condition is a downhill condition (or low-load driving) (S720), the HCU selects GPF regeneration during disengagement of the engine clutch 130 (S730B) and determines the GPF regeneration entry ratio β in consideration of the amount of accumulated soot and the outside temperature in addition to the gradient (S740B). The HCU 240 may perform GPF regeneration in a state in which disengagement of the engine clutch 130 is maintained (S760B), when a value obtained by summing the outputtable power of the motor and the value β' obtained by converting the entry ratio β into power is greater than the current required power (Yes of S750B). Step S750B may be repeatedly performed until GPF regeneration is completed. When the required power is further increased (No of S750B), GPF regeneration is stopped and the HCU 240 waits for the request for GPF regeneration from the engine control unit 210.

Here, the HCU 240 may transmit a GPF regeneration command to the engine control unit 210 upon determining entry into GPF regeneration and transmit a GPF regeneration stop command to the engine control unit 210 when the required power is further increased (No of S750A or S750B).

Although it is assumed that the internal combustion engine 110 is a GDI engine in the above-described embodiments, the present disclosure is not limited thereto and is applicable not only to a T-GDI engine but also to a diesel engine including a diesel particulate filter (DPF).

In addition, in determination of the driving environment condition, if the driving load is applied instead of the gradient, the driving load may be calculated through at least one of vehicle acceleration, the amount of fuel, an APS value, a tire pressure monitoring system (TMPS), SOC consumption, required torque or required power.

In determination of the driving environment condition, when the temperature condition is determined, the other information for estimating the outside temperature, such as GPF temperature, engine coolant temperature, engine oil temperature, engine catalyst temperature, transmission temperature and battery temperature, may be used instead of the outside temperature sensor.

Although power such as current required power or outputtable power of the motor may be used in determination of the final GPF regeneration entry condition in the above-described embodiments, torque such as required torque or outputtable torque of the motor may be used instead of the power.

In the hybrid vehicle according to at least one embodiment of the present disclosure, it is possible to more efficiently perform GPF regeneration.

In particular, since various factors such as a gradient, the amount of collected soot, and an outside temperature are considered, GPF regeneration according to an engine clutch and required power can be efficiently controlled.

The disclosure can also be embodied as computer readable code on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, and carrier waves (such as data transmission over the Internet).

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of controlling a hybrid vehicle including an electric motor, an engine including an exhaust gas purifying unit, and an engine clutch disposed between the electric motor and the engine, the method comprising:
   determining, by a controller, a driving environment condition including a first condition related to at least a driving load when a request for operating the exhaust gas purifying unit is received;
   determining, by the controller, a state of the engine clutch and an operation condition of the exhaust gas purifying unit when the exhaust gas purifying unit operates according to a result of determining the driving environment condition; and
   operating, by the controller, the exhaust gas purifying unit while maintaining the state of the engine clutch determined when the driving environment condition is satisfied; wherein the first condition is a gradient;
   wherein determining the state of the engine clutch includes:
   determining the state of the engine clutch to be a disengaged state when the gradient corresponds to downhill;
   determining the state of the engine clutch to be an engaged state when the gradient corresponds to uphill;
   determining a first entry ratio when the gradient corresponds to downhill; and
   determining a second entry ratio when the gradient corresponds to uphill;
   wherein determining the driving environment condition includes converting the first entry ratio or the second entry ratio into power;
   wherein, when the entry ratio is converted into the power, the power converted is added to outputtable power of the electric motor, thereby finally determining whether to enter operation of the exhaust gas purifying unit; and
   the larger the first entry ratio or the second entry ratio, the faster entry operation of the exhaust gas purifying unit, and the longer an operation time of the exhaust gas purifying unit.

2. The method according to claim 1, wherein the driving environment condition further includes a second condition related to an outside temperature and a third condition related to an amount of accumulated contaminant in the exhaust gas purifying unit.

3. The method according to claim 2, wherein the second condition and the third condition are further considered in determination of the first entry ratio and the second entry ratio.

4. The method according to claim 3, wherein the first entry ratio is increased as the gradient is decreased, as the outside temperature is decreased, and as the amount of accumulated contaminant is increased, and
   wherein the second entry ratio is increased as the gradient is decreased, as the outside temperature is decreased, and as the amount of accumulated contaminant is increased.

5. The method according to claim 1,
   wherein operating the exhaust gas purifying unit includes comparing a sum of the power converted and the outputtable power of the electric motor with required power, and
   wherein the driving environment condition is satisfied while the sum of the power converted and the outputtable power of the electric motor is greater than the required power.

6. The method according to claim 1, wherein the exhaust gas purifying unit further comprises:
   a gasoline particulate filter (GPF) when the engine is a gasoline direct injection engine or a turbo gasoline direction injection engine, or
   a diesel particulate filter (DPF) when the engine is a diesel engine.

7. A non-transitory computer-readable recording medium containing program instructions executed by a processor, the non-transitory computer-readable medium comprising:
   program instructions that determine a driving environment condition including a first condition related to at least a driving load when a request for operating an exhaust gas purifying unit is received, wherein the exhaust gas purifying unit includes a filter;
   program instructions that determine a state of an engine clutch and an operation condition of the exhaust gas purifying unit when the exhaust gas purifying unit operates according to a result of determining the driving environment condition; and
   program instructions that operate the exhaust gas purifying unit while maintaining the state of the engine clutch determined when the driving environment condition is satisfied;
   wherein the first condition is a gradient;
   wherein determining the state of the engine clutch includes:
   determining the state of the engine clutch to be a disengaged state when the gradient corresponds to downhill;
   determining the state of the engine clutch to be an engaged state when the gradient corresponds to uphill;
   determining a first entry ratio when the gradient corresponds to downhill; and
   determining a second entry ratio when the gradient corresponds to uphill;
   wherein determining the driving environment condition includes converting the first entry ratio or the second entry ratio into power;
   wherein, when the entry ratio is converted into the power, the power converted added to outputtable power of the electric motor, thereby finally determining whether to enter operation of the exhaust gas purifying unit; and
   wherein the larger the first entry ratio or the second entry ratio, the faster the entry operation of the exhaust gas purifying unit, and the longer an operation time of the exhaust gas purifying unit.

8. A hybrid vehicle including an electric motor, an engine including an exhaust gas purifying unit, and an engine clutch disposed between the electric motor and the engine, the hybrid vehicle comprising:
   a first controller configured to control the engine and to request operation of the exhaust gas purifying unit, wherein the exhaust gas purifying unit includes a filter; and
   a second controller configured to:
   determine a driving environment condition including a first condition related to at least a driving load when the request is received, determine a state of the engine clutch and an operation condition of the exhaust gas purifying unit when the exhaust gas purifying unit operates according to a result of determining the driving environment condition, and operate the exhaust gas purifying unit while maintaining the state of the engine clutch determined when the driving environment condition is satisfied;

wherein the first condition is a gradient;

wherein the second controller determines the state of the engine clutch to be a disengaged state when the gradient corresponds to downhill and determines the state of the engine clutch to be an engaged state when the gradient corresponds to uphill;

wherein the second controller determines a first entry ratio when the gradient corresponds to downhill and determines a second entry ratio when the gradient corresponds to uphill;

wherein the second controller converts the first entry ratio or the second entry ratio into power;

wherein, when the entry ratio is converted into the power, the power is converted is added to outputtable power of the electric motor, thereby finally determining whether to enter operation of the exhaust gas purifying unit; and wherein the larger the first entry ratio or the second entry ratio, the faster entry operation of the exhaust gas purifying unit, and the longer an operation time of the exhaust gas purifying unit.

9. The hybrid vehicle according to claim 8, wherein the driving environment condition further includes a second condition related to an outside temperature and a third condition related to an amount of accumulated contaminant in the exhaust gas purifying unit.

10. The hybrid vehicle according to claim 9 wherein the second controller further considers the second condition and the third condition to determine the first entry ratio and the second entry ratio.

11. The hybrid vehicle according to claim 10,
wherein the first entry ratio is increased as the gradient is decreased, as the outside temperature is decreased, and as the amount of accumulated contaminant is increased, and wherein the second entry ratio is increased as the gradient is decreased, as the outside temperature is decreased, and as the amount of accumulated contaminant is increased.

12. The hybrid vehicle according to claim 8, wherein the second controller compares a sum of the power converted and the outputtable power of the electric motor with required power and determines that the driving environment condition is satisfied while the sum of the power converted and the outputtable power of the electric motor is greater than the required power.

13. The hybrid vehicle according to claim 8, wherein the exhaust gas purifying unit further comprises:
a gasoline particulate filter (GPF) when the engine is a gasoline direct injection engine or a turbo gasoline direction injection engine, or a diesel particulate filter (DPF) when the engine is a diesel engine.

* * * * *